No. 656,548. Patented Aug. 21, 1900.
H. A. HUGHES.
JAR OR BOTTLE CLOSURE.
(Application filed Feb. 15, 1900.)
(No Model.)
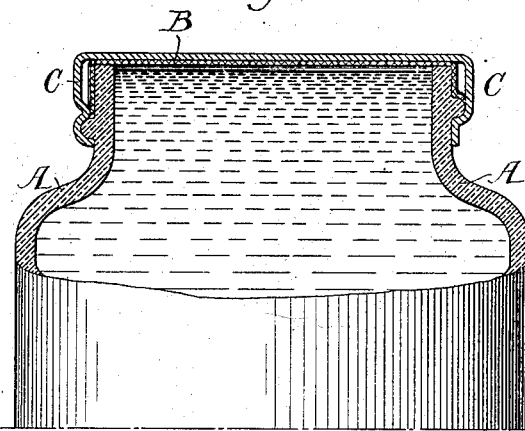
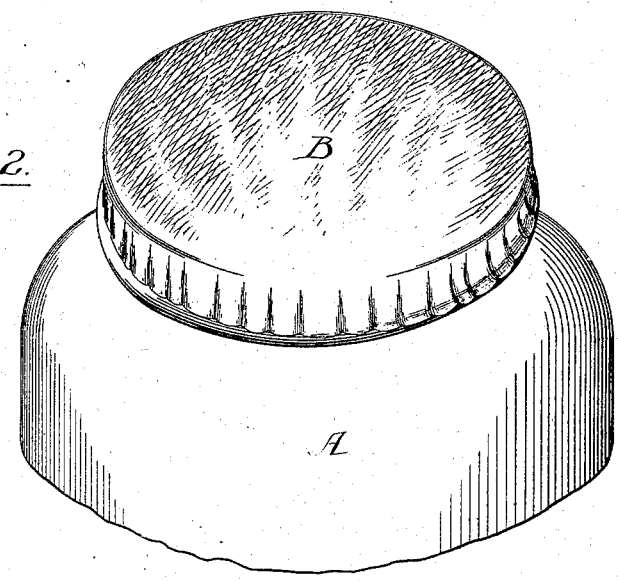
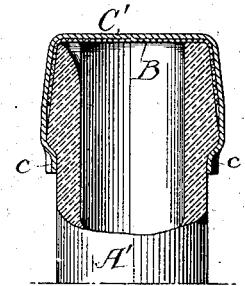
Witnesses:
Inventor:
Henry Albert Hughes,
by his Attorneys.

UNITED STATES PATENT OFFICE.

HENRY ALBERT HUGHES, OF PHILADELPHIA, PENNSYLVANIA.

JAR OR BOTTLE CLOSURE.

SPECIFICATION forming part of Letters Patent No. 656,548, dated August 21, 1900.

Application filed February 15, 1900. Serial No. 5,481. (No model.)

*To all whom it may concern:*

Be it known that I, HENRY ALBERT HUGHES, a citizen of the United States, residing in Philadelphia, Pennsylvania, have invented certain Improvements in Jar or Bottle Closures, of which the following is a specification.

My invention relates particularly to closures for glass jars and bottles containing fruit juices, syrups, and other food products of a more or less viscid consistency, the object of my invention being to produce a closure that will effectually prevent leakage from such jars or bottles.

My invention is fully illustrated in the accompanying drawings, in which—

Figure 1 is a sectional view of a portion of an ordinary fruit-jar, showing my improved closure applied thereto and having the ordinary metallic top or cap. Fig. 2 is a perspective view of a jar, showing my improved closure applied thereto, with the metal top or cap removed. Fig. 3 is a sectional view of a bottle, showing my closure applied thereto.

My improved closure consists of a woven fabric impregnated and coated with paraffin-wax. I have discovered that paraffin-wax when heated will adhere to glass and form practically a hermetic seal between the fabric with which it is coated and the glass of the jar or bottle. A jar or bottle thus sealed will not leak, as the wax will effectually resist the elements of the matter contained therein which usually attack the other forms of sealing-closures.

In carrying my invention into practice I take the jar or bottle A or A' after it has been filled with syrup, fruit juice, or other similar article of food of a sticky or viscid nature, and on the top and around the edge of said jar or bottle I place a piece of woven fabric B, impregnated and thickly coated with paraffin-wax. To secure the waxed fabric to the glass of the jar or bottle I may use a suitable tool adapted to pass around the edge of the jar or bottle and heat such tool, so as to melt the wax sufficiently to cause it to adhere to the glass. When cool, the wax will hold the cloth to the glass in the shape it has been pressed by the heated tool. After this has been done the cover C (for the jar) may be screwed in place. For the bottle I prefer to use a soft-metal cap C', which will have its edge c crimped, so as to be securely held in place.

Instead of using a heated tool to secure the waxed fabric to the jar I may heat the top C before the same is applied to the jar, so that when said top is screwed in place it will come in contact with the waxed cloth and melt the wax of the same sufficiently to confine the latter to the jar, thus effecting a perfect fluid-tight closure.

Having thus described my invention, I claim and desire to secure by Letters Patent—

A closure for jars or bottles for containing syrups, fruit juices, or other matter of a sticky, viscid nature, consisting of a waxed cloth adapted to extend over the mouth and around the edge of the jar or bottle and caused to adhere to the outer surface of the same by the external application of heat, in combination with a metallic cap detachably secured to the neck of the jar or bottle and serving to protect the waxed cloth sealing the same, substantially as described.

HENRY ALBERT HUGHES.

Witnesses:
JOHN WISEMAN,
JOSEPH H. RALSTON.